Jan. 22, 1952     T. J. SMULSKI     2,583,127
WINDSHIELD WIPER
Original Filed June 15, 1944     2 SHEETS—SHEET 1

INVENTOR.
THEODORE J. SMULSKI
BY
Moses, Nolte, Crews & Berry
ATTORNEYS

Jan. 22, 1952     T. J. SMULSKI     2,583,127
WINDSHIELD WIPER

Original Filed June 15, 1944     2 SHEETS—SHEET 2

INVENTOR.
THEODORE J. SMULSKI
BY
Moses, Nolte, Crews & Berry
ATTORNEYS

Patented Jan. 22, 1952

2,583,127

UNITED STATES PATENT OFFICE 2,583,127

WINDSHIELD WIPER

Theodore J. Smulski, Gary, Ind., assignor to Productive Inventions, Inc., a corporation of Indiana Continuation of application Serial No. 540,476, June 15, 1944. This application August 30, 1950, Serial No. 182,310

9 Claims. (Cl. 15—255)

This invention relates to windshield wipers, and more particularly to hand operated windshield wipers.

Many military vehicles, particularly reconnaissance cars, including armored cars and lighter cars, more popularly known as jeeps and peeps, are equipped with hand operated windshield wipers. These hand operated wipers, like other equipment employed in military service, are likely to be destroyed or damaged, either by enemy operations or by rough usage in the heat of battle. It is therefore important that the wipers be constructed and arranged so that they may be disassembled and reassembled, or removed and replaced readily, and this without the need for any special knowledge or skill.

To these ends it is a feature of the present invention that the wiper shaft, which carries at its forward end a quickly removable adapter and a wiper arm, and at its rear end an operating crank, is made long enough to space the adapter and crank apart by a distance greater than the thickness of the windshield frame (through which the shaft passes) and that a spring device is interposed on the shaft between the windshield frame and the adapter for urging the adapter in a forward direction. With this arrangement the spring device maintains the shaft and the parts carried by it substantially at their forward limit of movement so that there is no free play and rattling of the parts in normal operation. At the same time, the spring device limits the pressure with which the shaft carried parts bear against the windshield, and prevents binding.

The spring device is also advantageous for the reason that wiper frames vary in thickness, the spring device serving to take up differences in frame thickness. Then too, the adaptor cup through which the wiper arm is connected to the shaft may be forced on the shaft (which is tapered) to a greater or lesser extent, depending upon the force applied to the nut whereby the adaptor is forced onto the shaft. The spring device is also useful for accommodating manufacturing tolerances of all parts involved.

As heretofore constructed, these hand operated wipers have been adapted for operation only by the driver of the vehicle, and have been adapted to clear the windshield only directly in front of the driver. It is very advantageous, however, to provide tandem wipers so that the windshield will be cleared more adequately both for the driver and the passengers, and to provide a plurality of operating handles, either of which is capable of operating both wipers so that the wipers may be operated either by the driver or by a passenger.

It is a particular object of the present invention to provide practical and advantageous means for connecting a plurality of standard hand wiper units for common manual operation. To this end a connector link may desirably have pivotally connected to its opposite ends a pair of offset brackets, each bracket having an end portion adapted to be screw-connected in a channeled portion of an operating crank, and an offset portion which is permanently pivotally connected to the connector link.

A further important object of the invention is to enable the twin wiper mechanism to be detained with the wiper arms in out of the way positions, the detaining means being of such character that the wiper mechanisms may be forced free of the detaining means through operation of either of the crank handles; that is to say, by either the driver or a passenger. To this end, it is an important feature that the detaining or latching members are constructed and arranged to be cammed aside to ineffective positions in response to forcible operation of the wiper mechanisms.

Other objects and advantages will hereinafter appear.

In the drawings forming part of this specification,

This application is a continuation of application Serial No. 540, 476, filed June 15, 1944, now abandoned.

The novel windshield wiper structure is shown applied to a windshield frame 1 in which a pane of glass 2, which constitutes the windshield proper, is mounted.

The windshield wiper mechanism comprises a pair of hand operated wipers which are connected for operation in unison. One of the wipers is illustrated in Figure 2, and since the two wipers are duplicates of one another, a description of one will suffice for both.

Figure 1:
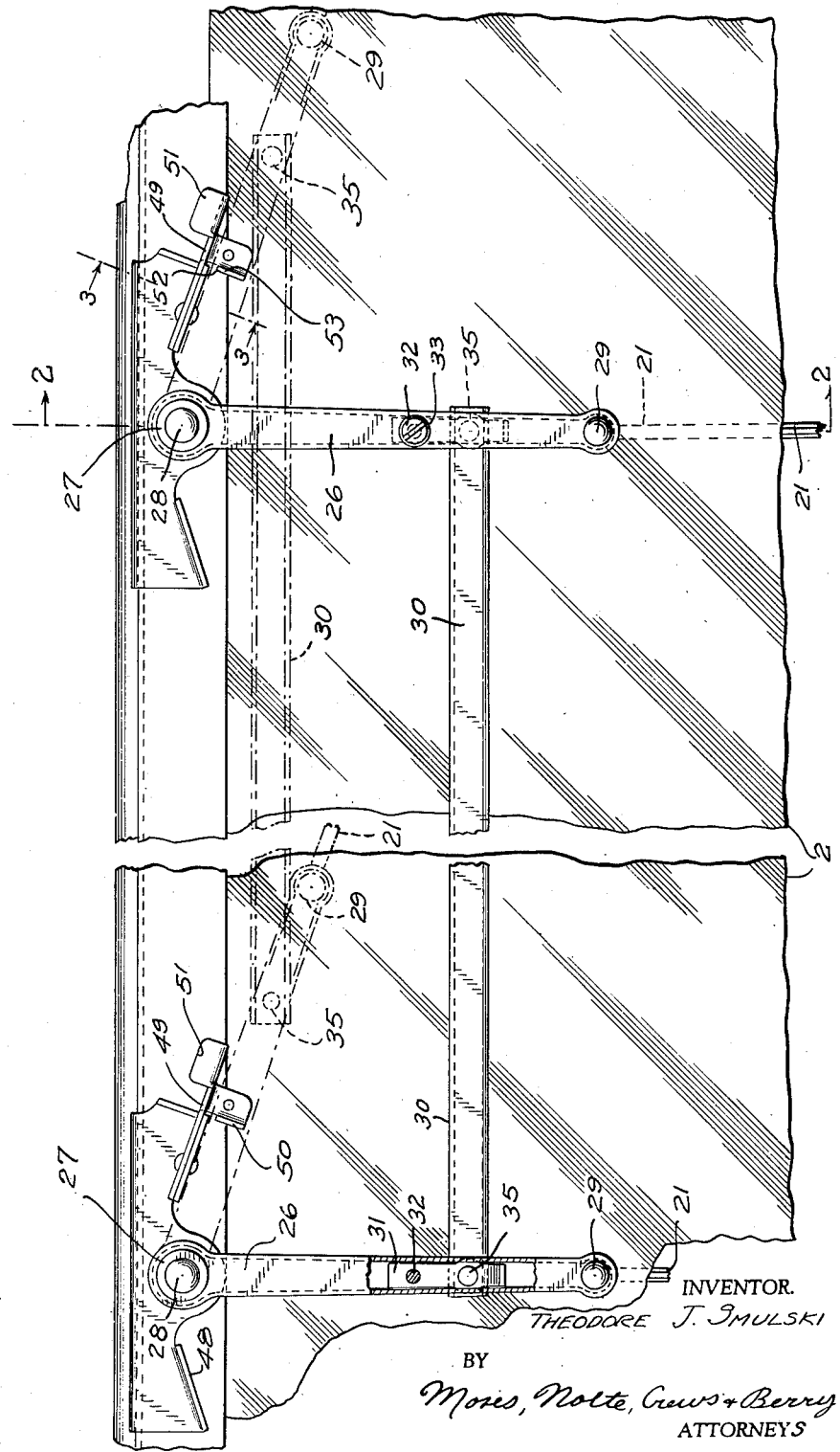
Figure 1 is a fragmentary view, in rear elevation, partly broken away, and broken away intermediate its ends for compactness of illustration, showing a tandem hand operated wiper embodying features of the invention.
Figure 2:
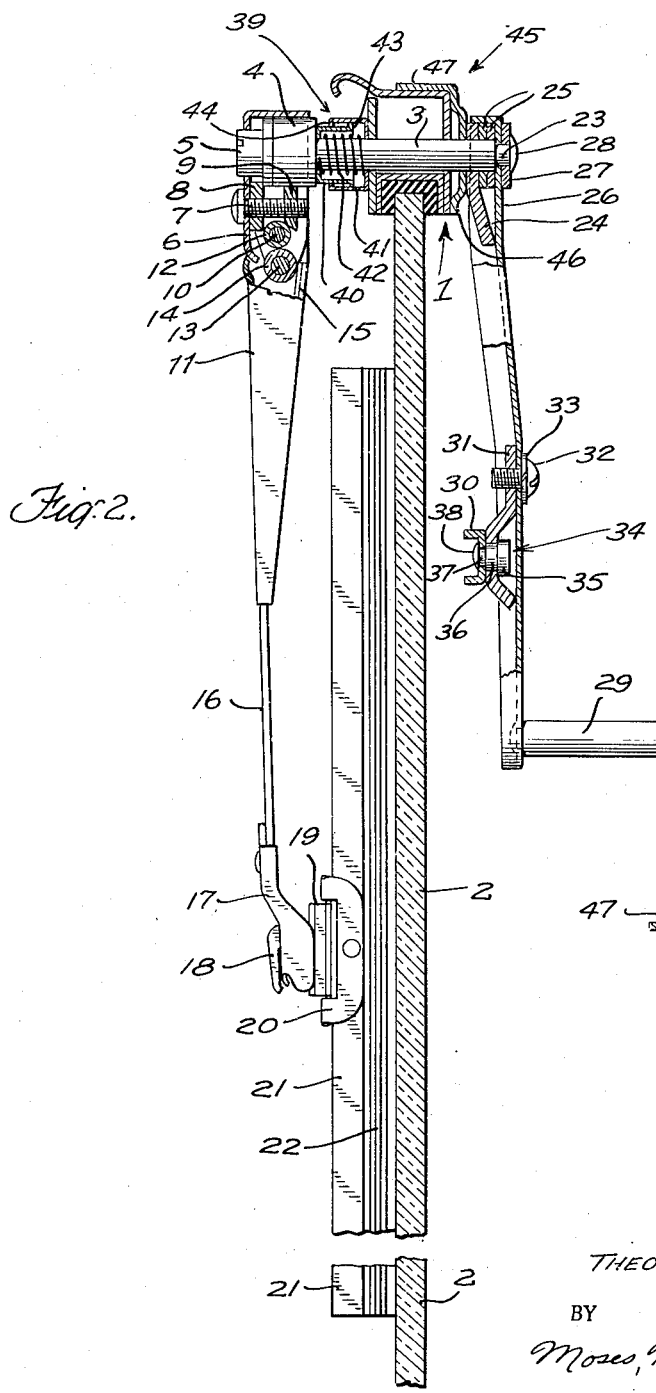
Figure 2 is a view in sectional side elevation, partly broken away, and broken away intermediate its ends for compactness of illustration, showing the structure of Figure 1.
Figure 3:
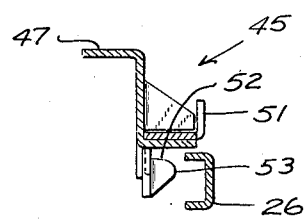
Figure 3 is a sectional view, taken upon the line 3—3 of Figure 1, looking in the direction of the arrows.

The wiper of Figure 2 comprises a shaft 3 which extends through the upper portion of the frame 1 and protrudes at the front and rear thereof. The forward end of the shaft 3 has fixed to it an adapter 4, the adapter 4 being made fast to the shaft 3 by means of a nut 5. When the nut 5 is unscrewed from the shaft 3, the adapter may be readily withdrawn, leaving the shaft free to be withdrawn from the windshield frame and reinserted in it. The wiper arm comprises an inner channeled section 6 through the forward wall of which a screw 7 is passed freely. The screw 7 also passes freely through a washer 8 and is threaded through a nut 9. A cross pin 10 carried by the side walls of the channeled member 6 pivotally supports a second channeled wiper arm section 11. A sleeve 12 is fitted upon the cross pin 10 and is engaged by the nut 9 as the screw 7 is turned to draw the nut 9 forward toward the forward wall of the channeled member 6.

The sleeve 12 causes the nut 9 to be pressed against the adapter 4. The nut 9 is desirably provided with teeth (not shown) which bite into the adapter 4 for fixing the wiper arm section 6 securely to the adapter 4 so that it cannot be withdrawn from the adapter nor turned relatively to it. This means of securing the wiper arm section 6 to the adapter 4 is not claimed herein because it is disclosed and claimed in my pending application Serial No. 470,035, filed December 24, 1942, now Patent No. 2,357,280, dated August 29, 1944, for Windshield Wiper Arms.

The wiper arm section 6 includes a further cross pin 13 upon which a sleeve 14 is revolvably mounted. A leaf spring 15 carried by the wiper arm section 11 bears against the sleeve 14 to bias the wiper arm section 11 and the parts carried by it toward the windshield 2. The construction and arrangement of the spring are not fully illustrated nor described herein, because they may be of any conventional construction and are desirably constructed and arranged as disclosed in United States Patent No. 2,326,402 granted to me on August 10, 1943.

The wiper arm includes a further section 16 upon the outer end of which a slotted connector 17 is secured. The connector 17 is adapted to receive a hooked member 18 forming part of a cooperating hanger 19 carried by a blade clip 20. The blade clip 20 is affixed to a rigid blade frame 21 in which a wiping element 22 of rubber or other suitable material is secured.

The shaft 3 is formed with a reduced rear end portion 23. Upon the rear full diameter portion of the shaft 3 there are impaled a thrust bearing member 24 and a pair of spacer washers 25. Upon the reduced end portion 23 of the shaft there are impaled a channeled operating crank 26 and a washer 27. The rear extremity of the shaft is upset to form a head 28 whereby the operating crank 26 is permanently and fixedly secured to the shaft 3. The crank 26 has affixed to the outer end thereof an operating handle 29.

The cranks 26 of the two wiper units are connected to one another through a connector link 30 and associated connector brackets 31. Each bracket 31 includes an end portion which is formed with a threaded opening. A screw 32 is adapted to be passed through the body portion of the channeled crank 26 and threaded through the bracket 31. A lock washer 33 may advantageously be interposed between the head of the screw 32 and the channeled crank 26. The end portion of the bracket 31 fits between the side walls of the channeled crank 26 so that it cannot turn relatively to the crank and there is no tendency in operation for the screw 32 to be backed out and worked loose.

The opposite end of the bracket 31 is offset forwardly so that its front face stands clear of the side walls of the channeled crank 26. A connector pin 34 is employed for connecting the bracket 31 to the link 30. The pin 34 comprises a head 35, a body portion 36, and a reduced body portion 37. The bracket 31 has rotative engagement with the body portion 36 and is desirably of slightly less thickness than the length of said body portion. The link 30 is impaled upon the reduced portion 37 and is riveted thereto by the upsetting of an end portion 38 of the pin 34 to provide a head.

Since the movement of the link 30 is limited by engagement with a shoulder formed by the junction of the body portions 36 and 37, there is no tendency to bind the bracket 31 between the link 30 and the head 35, so that free and easy pivotal action is at all times assured. Since the cranks 26 are duplicates of one another, the link 30 is connected to the brackets at equal distances from the shafts 3. By mounting the shafts 3 at a distance from one another equal to the length of the link 30, between the centers of the openings that receive the pins 34, parallel operation of the cranks 26 may be secured.

Upon the shaft 3 there is mounted a spring device 39 between the forward face of the frame 1 and the adapter 4. This device comprises a pair of telescoping cup-shaped members 40 and 41 between which the coil spring 42 is interposed. The inner member 40 is formed with an outturned flange 43, while the outer member 41 is formed with an inturned flange 44. The flanges prevent separation of the telescoping parts and the spring, maintaining the unitary character of the device.

The adapter 4 and the crank 26 are mounted in fixed locations upon the shaft 3 and at a fixed distance from one another. The available space between the bearing member 24 and the adapter 4 is greater than the thickness of the windshield frame, by an amount sufficient to enable the spring device 39 to be interposed between the front of the frame and the adapter in a partially expanded condition. When the parts are assembled, therefore, the bearing member 24 is drawn toward the frame, and the spring device is pressed against the frame with a firm but limited pressure determined by the degree of compression of the spring device. This is sufficient to prevent rattling of the parts, but is light enough to secure free easy action in operation.

Each of the wiper assemblies also comprises a stop and detent mechanism which is not claimed per se herein, because it is disclosed and claimed in my pending application Serial No. 629,653, filed November 19, 1945, for Windshield Wiper Apparatus, which is a continuation of application Serial No. 475,482, filed February 11, 1943, for Windshield Wiper Apparatus. Briefly, this device consists chiefly of a plate 45 comprising a body portion 46, a forwardly extending web 47 and rearwardly extending stop flanges 48. The device 45 is adapted to be impaled upon the shaft 3 and is restrained against rotation by engagement of the web 47 with the upper horizontal face of the windshield frame.

The flanges 48 extend across the path of the channeled operating crank 26, limited movement of the crank to an obtuse angle and preventing operation of the windshield wiper blade into a position to strike the windshield frame. On one of the flanges 48 of each of the devices 45 a latch 49 is pivotally mounted, the latch including a finger 50 which may be set clear of the path of the crank 26 or moved into the channel of the crank 26 by a finger piece 51.

The point should be noticed that the available stroke of the spring device 39 is substantially less than the fore and aft extent of the web 47, there being no possibility of freeing the device 45 for rotation.

Since each of the wiper assemblies includes a latch 49, it is evident that either the driver or a passenger may lock both wiper arms through the setting of the latch 49 nearest him to a detaining position.

It is important in military vehicles that provision be made for enabling both wiper arms to be freed for operation by either the driver or a passenger, and to this end it is an important feature of the present invention that each detaining finger 50 is formed with a downwardly sloping upper face 52 and with a curved end portion 53 of substantial radius. With this construction, the tandem wiper structure may be forcibly operated through either crank to cam aside either of the fingers 50 that may be effective, thereby to free the wipers for normal operation.

While I have shown a particular embodiment of my invention, it is to be understood that this is merely illustrative as to the principles disclosed. It will, of course, be understood that I do not wish to be limited thereto, since it is apparent that the principles herein disclosed are susceptible of numerous other applications and modifications may be made in the instrumentalities employed without departing from the spirit and scope of my inventions as set forth in the appended claims.

What is claimed is:

1. In a windshield wiper, the combination with two parallel shafts extending in a fore and aft direction, of a wiper mounted on the forward end of at least one of the shafts, channeled operating arms connected to the rear ends of the respective shafts for disposition adjacent the inner side of a windshield, operating handles on the arms, connector brackets detachably secured in the channels, each bracket including an end portion that extends between the channel walls and an offset portion that extends beyond the channel walls, and a link pivotally connected at its opposite ends to the offset portions of the respective brackets.

2. In a hand operated windshield wiper, adapted to be mounted on a windshield, which includes a frame having a face portion and adjacent surface portions offset therefrom, in combination, a wiper mounting assembly including a shaft adapted to extend through the windshield frame and to protrude at the front and rear thereof, a thrust member affixed to the protruding forward end of said shaft, an operating crank member affixed to the protruding rearward end of said shaft, a wiper blade carried by the shaft, a spring device of limited movement adapted to be interposed between the frame and the thrust member to prevent rattling of the parts and to limit the force with which the assembly is held to the windshield frame, and an apparatus located between the windshield frame and the operating crank member affixed to the shaft, said apparatus having a base portion formed to receive such shaft and held in position between the windshield frame and the operating crank member by the wiper mounting assembly acting through said spring device, said apparatus including further portions extending in offset relation to said base portion and adapted to engage offset surface portions of said windshield frame to limit rocking of said apparatus about the axis of said shaft, and stop portions extending in offset relation to said base portion and adapted to limit movement of said wiper to an obtuse angle, said further portions of said apparatus extending in a fore and aft direction for a distance substantially in excess of the limited fore and aft movement of the spring device.

3. In a hand operated windshield wiper, adapted to be mounted on a windshield which includes a frame having a face portion and adjacent surface portions offset therefrom, in combination, a wiper mounting assembly including a shaft adapted to extend through the windshield frame and to protrude at the front and rear thereof, an adapter removably affixed to the protruding forward end of said shaft, an operating crank member affixed to the protruding rearward end of said shaft, a wiper arm removably secured to the adapter, and a compression spring device of limited movement adapted to be interposed between the frame and the adapter to prevent rattling of the parts and to limit the force with which the assembly is clamped to the windshield frame.

4. A windshield wiper, adapted to be mounted on a windshield, which includes a frame having a face portion and a surface portion offset therefrom, in combination a wiper mounting assembly including a shaft adapted to extend through the windshield frame and protrude at the front and rear thereof, adapter means affixed to the protruding forward end of said shaft, a crank member affixed to the protruding rearward ends of said shaft, a wiper arm carried by said adapter means, spacer means having a base portion formed to receive said shaft disposed between said windshield frame and said crank member, a spring device adapted for disposition between the frame and one of said means whereby to assist in holding said spacer means in a predetermined position and at the same time prevent rattling of the parts, said spacer means including a portion extending in an offset relation to said base portion adapted to engage the offset surface of said windshield frame to limit rocking movement of said spacer means about the axis of said shaft, and a stop extending in offset relation to said base portion and adapted to limit movement of said wiper arm in one direction.

5. A windshield and frame therefor, a first shaft extending through said frame, an arm carried by said first shaft, a second shaft parallel to the first shaft, a second arm on second shaft pivotally mounted with respect to said frame, wipers carried by said arms, means for operating said arms, a pair of bracket means associated with said frame adjacent one side of the windshield, and manually controlled latch means carried by each of said bracket means and movable in a plane transverse to the plane of the windshield for locking the arms in predetermined positions with respect to said bracket means.

6. A windshield and frame therefor, a pair of shafts extending through said frame, arms carried by said shafts, wipers carried by said arms, means for operating said arms, a pair of bracket means associated with said frame adjacent one side of the windshield, stops on said bracket means, and hand controlled lever means carried by each of said bracket means and having catch means engageable with the operating means for locking the arms in predetermined positions.

7. A windshield frame, a shaft extending through said frame, an arm carried by said shaft, a second wiper arm pivotally mounted with respect to said frame and operatively related to said first arm, wipers carried by said arms, means for operating said arms, bracket means associated with said frame, stops on said bracket means, inflexible locking means provided on each of said bracket means, bridge means connecting said operating means together, and handle means for simultaneously moving said operating means to positions relative to the stops whereby one or the other of said locking means may be moved by hand for locking the arms against movement.

8. A windshield frame, a pair of shafts extending through said frame, arms carried by said shafts, bracket means associated with said frame, stops on said bracket means, hand operated inflexible locking means provided on each of said bracket means, and means for moving said arms to positions relative to said stops after which one or both of said locking means may be manipulated for locking the arms against movement.

9. A windshield wiper assembly comprising a pair of brackets adapted to be mounted adjacent a windshield frame, an arm pivotally mounted with respect to each bracket, bridge means connecting the arms together, and inflexible latch means pivotally carried by each bracket constructed and arranged whereby one or both may be manipulated to hold the arms against movement after the arms are swung against the brackets.

THEODORE J. SMULSKI.

REFERENCES CITED

The following references are of record in the file of this patent:

UNITED STATES PATENTS

| Number | Name | Date |
|---|---|---|
| 1,065,525 | Henkel | June 24, 1913 |
| 1,110,368 | Young | Sept. 15, 1914 |
| 1,165,704 | Ousley | Dec. 28, 1915 |
| 1,301,609 | Scott | Apr. 22, 1919 |
| 1,520,904 | Keim | Dec. 30, 1924 |
| 1,569,412 | Waters | Jan. 12, 1926 |
| 1,594,954 | Hesse | Aug. 3, 1926 |
| 1,639,778 | Locke | Aug. 23, 1927 |
| 1,687,412 | White | Oct. 9, 1928 |

FOREIGN PATENTS

| Number | Country | Date |
|---|---|---|
| 224,399 | Great Britain | Nov. 13, 1924 |